May 27, 1941. A. S. WILSON 2,243,492
MEAT TENDERIZER
Filed July 20, 1939
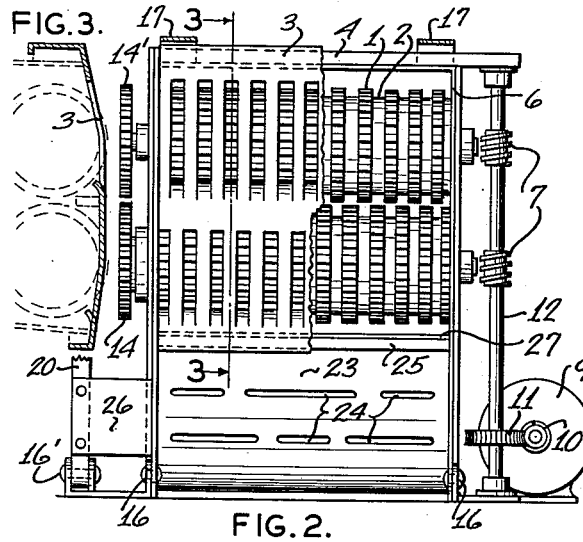
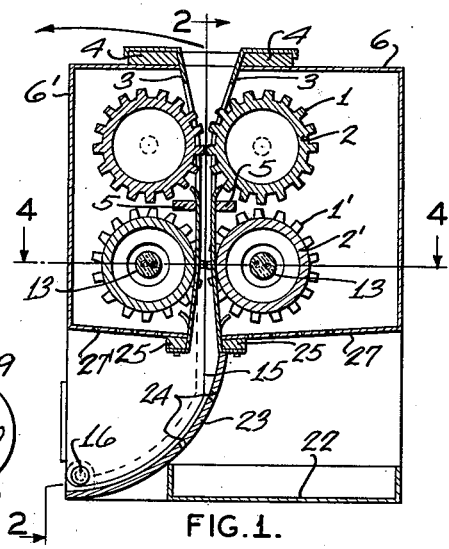
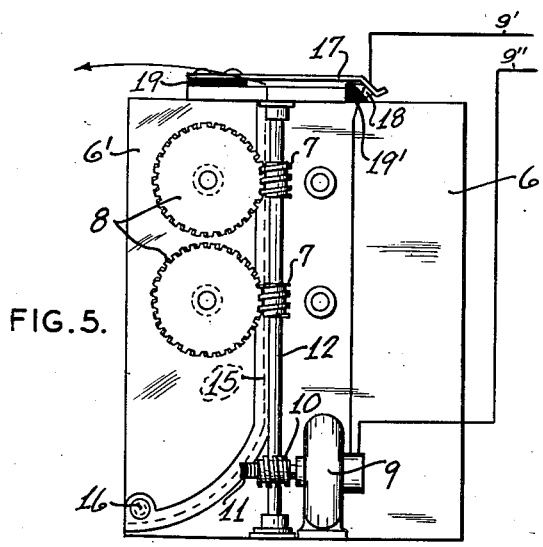
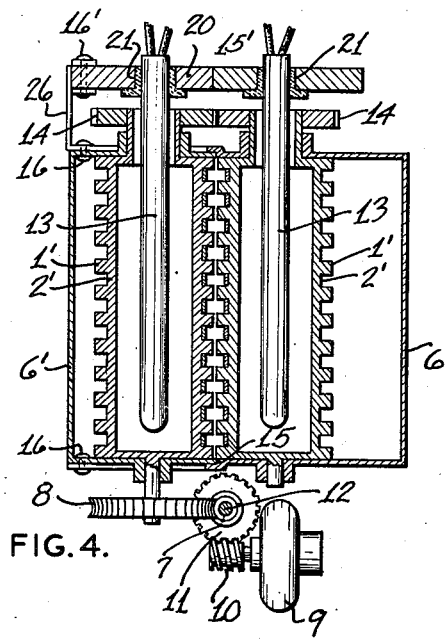
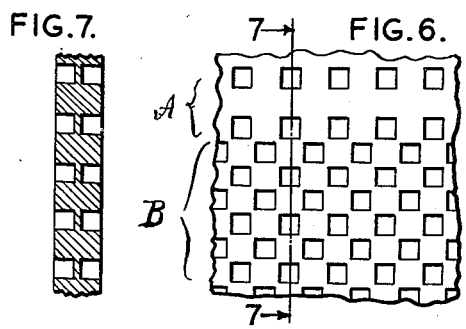
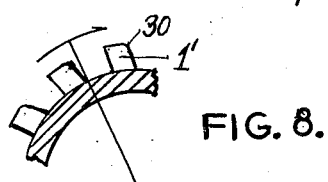
INVENTOR
ALBERT S. WILSON
BY Harold M. Plaisted,
ATTORNEY.

Patented May 27, 1941

2,243,492

UNITED STATES PATENT OFFICE 2,243,492

MEAT TENDERIZER

Albert S. Wilson, St. Louis, Mo., assignor of one-half to Harry T. Floyd, St. Louis, Mo.

Application July 20, 1939, Serial No. 285,509

8 Claims. (Cl. 17—26)

This invention relates to certain new and useful improvements in meat tenderizers, the peculiarities of which will be hereinafter fully described and claimed.

It has been the practice to pound slices of meat and also to puncture the meat with hammers having sharp pointed pyramids thereon which puncture the fibers.

The preferred form of my device provides flat-topped projections upon opposing rolls, so arranged that the projections are opposite each other when passing and make depressions from both sides of the slice of meat, which are separated by a thin layer of meat between the depressions. The said projections exert positive pressures vertical to both surfaces of the meat, which cause a lateral sliding of the fibers under such compression, which movement of the fibers tends to render the resulting meat more tender than it was originally. My main object is to tenderize practically the whole body of the slice. I provide means such as projecting cubes to make preferred cubical depressions in the sides of the slice by one set of rollers, and then subject the partially treated slice to another set of rollers which make corresponding depressions in intermediate portions of the slice, the fibers of which are made to move laterally back again or reversely, by the compressive action of the flat surfaces of the opposing cubes in the said successive operations on the sides of the slice, and then be subjected to heat sufficient to cook the meat as it passes through the second set of rolls, so that when it leaves the rolls it is cooked and ready to be served to the customer.

In attaining the above named objects I provide the hereinafter described construction and description exemplifying the preferred method of attaining the aforementioned objects, and in which reference is made to the accompanying drawing.

Fig. 1 represents a vertical sectional view of two pairs of rolls having cubical opposing projections arranged in circumferential and lengthwise rows, and the pair of rolls below the first pair having the projections staggered or offset with regard to those in the upper pair;

Fig. 2, an elevation of part of an upper and a lower roll of each pair, viewed from the line 2—2 of Figure 1 and showing part of the guiding strips or looms;

Fig. 3, a sectional view on the line 3—3 of Fig. 2 of one set of guiding strips or looms;

Fig. 4, a sectional view on the line 4—4 of Fig. 1 of the lower set of rolls shown in Fig. 1, illustrating the relative position of the cubical projections and the heating elements;

Fig. 5, an elevation of one end of the machine showing the worm gear driving mechanism and motor;

Fig. 6, an enlarged detail view of the portion A of the slice that has passed through the first pair of rolls and showing the cubical depressions formed therein, and an adjacent portion B of the slice having the depressions interposed and staggered with regard to the first set of depressions;

Fig. 7, a sectional view on the line 7—7 of Fig. 6; and

Fig. 8, an enlarged detail view of a projection showing its slant backward and its front corner rounded.

Prior devices have used sharp pointed pyramidal projections as above mentioned, but those effect a tearing or puncturing action on the meat which is not so effective in tenderizing the meat as is the compression which is produced by my construction. When my cubical opposing teeth meet opposite sides of the slice, the compression from both sides causes a simultaneous sliding movement of the fibers into the portion of the meat surrounding the respective teeth. When the same slice of meat reaches the second pair of rolls the staggered or offset arrangement of the cubical projections causes cubical depressions intermediate of those formed by the first roll, and effect a corresponding compression and lateral reverse movement of the fibers on most of the interposed portions of the meat not previously acted upon. This action of compression and lateral movement of the fibers is believed to be the cause of the beneficial tenderizing result upon the meat, which is attained by my construction. Simultaneously with the production of the cubical depressions in the meat while passing the second pair of rolls, I subject the meat to the action of heat, such as that produced by an electric heating element incased in each of the second pair of rolls, so that when the meat leaves the heated rolls it is ready for consumption.

Referring to the drawing, the cubical projections 1—1' are arranged in respective rolls 2—2' circumferentially, and in the circumferential spaces between adjacent rows are disposed respectively strips 3 of thin sheet metal which are sunk in these spaces between the rolls at the bases of the projections, and pass the rolls above and below and present opposing sets of guiding strips or looms for each roll of the upper and lower pair of rolls. These strips form a guiding passageway for the meat and are respectively secured removably by pins above the upper pair of rolls to horizontal strips 4 at the entrance of the rectangular box casing 6, and pass downward between the upper pair of rolls past horizontal bars 5 forming braces intermediate the upper and lower rolls. When they reach this bar on respective looms, the lower strips are disposed in a staggered or offset relation to the upper strips, in order to correspond with the circumferential spaces between the projections of the lower pair of rolls, the teeth 1' of which as stated previously, are staggered relative to those of the upper pair. The lower ends of the guiding strips are removably secured in the respective sides of the exit opening below the second pair of rolls. These loom strips pull the meat off the projections to avoid winding it on the rolls.

Referring to Fig. 5 showing the driving mechanism, the rolls are driven by worm 7 and wheel 8 drives operatively connected to the respective rolls, and actuated by an electric motor 9 through worm 10 and wheel 11. Lead wires to the motor are numbered 9'—9'' respectively. The worms 7 and wheel 11 are mounted on a vertical shaft 12. The slow motion given to the rolls, affords time for the compressive action of the cubical projections to produce the lateral movement of the fibers in the tenderizing treatment afforded by both pairs of rolls, and also affords time for the electric heating elements 13 in the second pair of rolls to cook properly the meat passing slowly between them.

The opposite end of my machine shown in Fig. 4, illustrates the driving connections of meshed spur gears 14 effecting the desired rotation toward each other of the lower pair of rolls 2'. The upper pair of rolls 2 are similarly rotated by meshed spur gears 14' (Fig. 2).

Each pair of rolls is mounted in suitable boxes on respective ends of the casing, which ends are divided and match along meeting edges 15 forming, with the adjacent front wall of the casing, a movable front portion 6', which is pivoted at 16 near the bottom and front at each end, so that the casing will open along the joints 15 by turning downward the front portion 6'. The front rolls of the upper and lower pairs are mounted in this movable portion of the casing, and carry their respective worm wheels 8 which mesh with corresponding worms 7, as shown in Fig. 5. On the opposite ends of said rolls, the spur gears 14 and 14' will open their mesh connection of matching gears on the rear rolls, and similarly the worm gears 8 will disengage their mesh connection with their respective worms 7, when the pivoted front portion is turned downward in the direction of the arrow as indicated in Fig. 5. When the casing is thus opened up, the two sets of opposing looms can be readily disconnected from their removable attachment at the top and bottom portions, and the two pairs of rolls will be fully exposed and can readily be cleaned after use. This is a matter of sanitary importance.

A suitable closing means, such as an automatic engaging and disengaging catch to connect this pivoted portion with the main portion of the casing, is provided near each end wall, such as a brass spring 17 having one end fixed to the front portion 6' of the casing, and the other end bent down to engage a sloping contact piece 18 on the fixed portion of the casing. A suitable insulation 19—19' insulates these contacts 17 and 18 from the casing. This insulation preferably forms a projection at the driving end of the casing, Fig. 5, and is split at the joint line 15. The fixed portion of the overhanging bar supports the upper end of a vertical shaft 12 on which the worms 7 and the wheel 11, are mounted. The slanting engagement of the end of the spring 17 with the sloping piece 18 as indicated in Fig. 5, will normally keep the joint 15 closed and the opposing rolls in operative position, as above described. Should a bone or other obstruction pass into the entrance of the machine, the outward pressure thus caused on the upper pair of rolls, will disengage the spring catch 17 from its contact piece 18, open the pivoted front portion 6' and disconnect the operative parts. The spring catch is in duplicate on the opposite ends of the casing, and the spring 17 and the sloping contact 18 of one catch are wired by lead wires 9'—9'' in series with the motor, as indicated in Fig. 5. Thus when the front portion 6' is turned forward even slightly upon the release of the catch 17 and its contact 18, the motor will be cut out and the operative parts of the machine will instantly stop. This safety feature is an important part of my machine and is shown and described as the preferred way of forming such safety device. An equivalent safety catch may be employed, however.

Referring again to the electric heating elements 13, they are preferably fixed in a stand 20 adjacent the open ends of the lower rolls which are shown in Fig. 4 as having enlarged journals to allow inserting the said elements into said rolls, and allow supporting them centrally therein. These elements are mounted in suitable electric and heat insulating collars 21 secured in the stand 20 and suitably wired to a source of current.

The said stand 20 is also divided at 15' corresponding with the joint 15 of the casing, and the front portion of the stand is also pivoted at 16' Fig. 2, alined with the pivot 16 before mentioned at the front of the casing 6'. The pivoted front portion of said stand is braced by an extension plate 26, or is otherwise connected to the pivoted front portion of the casing, and a similar spring catch may be employed to hold the split stand 20 together. When the nap connection 17—18 is opened as above described, the front portion of the casing and corresponding portion of the stand 20, will turn on their common axis through the pivots 16 and 16' and allow the opening of the casing as above described. The wires connected to the heating element 13 are long enough to allow this opening movement of the stand, and the front portion of the casing and corresponding portion of the stand 20 will turn on their common axis through the pivots 16 and 16', and allow the opening of the casing as above described. This spring control of the rolls allows their temporary separation when a piece of bone or other hard substance is about to enter between the rolls from either pair, especially the upper pair of rolls.

While I have described and shown four rolls arranged in upper and lower pairs, and the heating element applied to lower pair to treat the meat as it passes therefrom, it is evident that I may dispense with the upper pair of rolls and use the lower pair only, providing the effect produced upon the meat appears to be sufficient in effecting the tenderizing process. However, I prefer that the upper and lower pairs be used in order to extend the tenderizing process over practically the whole surface of the meat and intermediate portions as above described.

Referring to Fig. 1, the bottom of the casing is provided with a pan 22. The bottom ends of the looms and their supporting bars forming the exit passage for the meat, have a slanting concave plate portion 23 extending from one bar 25 of the exit downward to the bottom of the casing, to receive the drip from the slice of meat passing the rolls. This concave plate has slits 24 to receive the drip from the exit passage and deliver it to the pan 22. Both of the looms at the exit end of the said passage are braced by lower bars 25 to which the looms are removably secured. Below the lower rolls are partitions 27—27' inclined or perforated to receive the drip from the rolls above them, and deliver it into the said pan 22.

From the above description and the drawing it will be evident that the slice of meat entering the passageway between the looms and passing the upper ends of the opposing looms, will be engaged by the opposing teeth of the upper pair of rolls and forced to travel downward while the depressions are made in both sides of the slice, as indicated in the upper portion of Fig. 6. As the slice of meat travels downward under gravity and the propelling forces of the upper pair of rolls, its lower edge will be engaged by the projections 1' of the lower pair of rolls, and forced to pass down and be more completely tenderized by the formation of interposed depressions, as above described. The heating elements in said lower pair of rolls will act upon the meat passing between said lower rolls, so that when the slice leaves the rolls and passes down the plate 23, it is tenderized and cooked ready for serving to a customer.

The rotation of the rolls is comparatively slow, such as one revolution per minute, as has been demonstrated in actual practice to be sufficient for cooking the passing meat. If the heat is not fully acting when the machine is first operated and the heating elements are not fully warmed up, the slice of meat may be returned to the mouth of the passageway between the rolls, and passed through a second time.

The tenderizing effect by the compressive action of the opposing projections is based on the lateral movement of fibers from the pressure of the flat top projections, first in one direction and then reversely; and such movement is more readily produced when the meat is in its raw condition passing the upper pair of rolls. When the meat is passing the lower pair of rolls and is subject to the cooking heat of the heating elements, the lateral movement of the fibers is not so pronounced as when they are acted upon by the projections of the upper rolls. The tenderizing effect of the upper rolls is supplemented by further movement of the fibers reversely, as the meat passes the lower pair of rolls where the fully cubed slice is cooked as above described. The combined action of the two pairs of rolls gives the best tenderizing effect upon the meat passing them, and is the preferred form of my machine. I may, however, use only the lower pair of rolls with the heating elements therein, to attain a modified result which may not be equal to the beneficial cubing and tenderizing of the meat obtained by the use of two pairs of rolls arranged and operated as above described.

It has been demonstrated by actual use that, by slanting the depressions backward on the several rolls and inclined to a radius through the respective teeth, as shown in Fig. 8, and slightly rounding the obtuse forward outer corner edge 30 (about 1/16 inch radius), the projections leave the meat more readily, and avoid any tendency of the meat to cling to the projections as the rolls turn as above described. This is an important feature of my invention.

While I have described the rolls, as heated by electrical means, it is evident that other forms of heat such as gas, steam or other heating medium may be used.

It is also evident that the speed of the rolls may be varied and revolve faster or slower than the rate previously stated, in order to give the desired cooking effect to the meat passing between the heated rolls. Each tooth and its corresponding depression, have four sides and a terminal side, which provide ten heated surfaces on opposing projections adapted to contact the meat and distribute the heat uniformly, and with beneficial effect, to the meat passing between said rolls. The projections having substantially parallel sides, and especially a backward slant as in Fig. 8, the base of each projection is not enlarged, and the number of lengthwise rows in rolls that are 2 1/4 inches outside diameter and containing 18 such rows, has been found to operate efficiently; and the meat is cooked clear through at all of the contact portions of said projections.

While I have shown and described the rolls arranged to form a vertical passageway between the looms, I do not confine my invention to this arrangement nor to details of construction, except by the appended claims.

I claim:

1. A meat tenderizer having in combination two pairs of rolls mounted in upper and lower pairs, the rolls of each pair mounted on opposite sides of a central plane and having flat-topped projections arranged in lengthwise rows adapted to be disposed successively opposite each other under rotation of the rolls toward said central plane to dispose the flat tops of said projections closely adjacent when rotatably passing, and said projections being arranged in circumferential rows that are staggered on one pair of rolls relative to the projections on the other pair of rolls.

2. A meat tenderizer comprising two pairs of rolls arranged in upper and lower pairs, the rolls of each pair being arranged horizontally opposite each other and provided with projections in lengthwise rows that are successively disposed opposite each other under rotation, and are arranged in circumferential rows that are staggered in one pair relative to the other pair of rolls, a casing enclosing said rolls, and vertically disposed metal strips arranged in spaces between said rolls in two sets and secured at their upper and lower ends in said casing to define a vertical passage between said rolls for the downward passage of meat under gravity and the propulsion of said projections.

3. A meat tenderizer comprising a rectangular box casing, the ends of said casing being divided to form a joint and form a movable portion with regard to a fixed portion of the casing, operative rolls mounted in both said portions and cooperating with each other when the casing is closed and exposed when the joint is opened, means including a spring catch to maintain normally the closed condition of the casing, a motor having operative connection with said rolls, and electric connections for said motor arranged in series with said spring catch to stop the motor when the casing is opened.

4. A meat tenderizer having in combination a rectangular box casing having its ends divided by matching joints forming a movable portion pivoted at its lower front ends to allow opening said joints, two pairs of rolls arranged in upper and lower pairs each pair horizontally opposite each other and one roll of each pair being mounted in the said pivoted portion of the casing, worm gears on said rolls, a vertical shaft mounted on the fixed portion of said casing, worms on said shaft normally meshing with said gear and having a worm gear, and a motor having a worm adapted to rotate the worm wheel on said vertical shaft, the meshed engagement of said worms on the shaft and their matching worm gears on the rolls being disengaged by the opening of said pivoted portion.

5. A meat tenderizer having in combination a casing divided into a fixed portion and a pivoted movable portion, opposing rolls respectively mounted in the fixed and the pivoted movable portions, a driving motor operatively connected to said rolls, and an automatic catch normally closing said portions of the casing when engaged and having electric contacts and electric connections for said contacts wired in series with the motor to stop the rotation of said motor when the catch is disengaged.

6. A meat tenderizer having in combination rotary rolls provided with longitudinal and circumferential rows of cubical projections characterized by being respectively slanting with regard to radii through the respective teeth to allow of disposing the teeth slanting backward relatively to the rotation to facilitate withdrawal from the meat engaged by said projections.

7. A meat tenderizer having in combination rotary rolls provided with longitudinal and circumferential rows of cubical projections characterized by being respectively slanting relative to radii through respective teeth and rounded on the obtuse outer edge of each slanting tooth to facilitate withdrawal from the meat engaged by said projections.

8. A meat tenderizer having in combination a rectangular box casing divided at its ends into a fixed portion and a movable portion having pivotal connection therewith, tenderizing rolls mounted in said casing and comprising an upper pair of rolls and a lower pair of rolls, one of each pair being mounted in the fixed end portion and the other in said movable portion of the casing, and each of the rolls mounted in the movable portion having on one end a worm gear and on the other end a spur gear that is normally meshed with a corresponding spur gear mounted on the horizontally adjacent opposite roll respectively in each pair that is mounted in the fixed portion of the casing, a vertical shaft supported by the fixed portion and having worms respectively engaging the adjacent worm gears on the rolls of the movable portion, and adapted to be disengaged therefrom by opening said movable portion, a motor, and an operative worm and gear connection of the motor with said vertical shaft.

ALBERT S. WILSON.